(12) United States Patent
Compton et al.

(10) Patent No.: US 9,470,707 B2
(45) Date of Patent: Oct. 18, 2016

(54) ATOM INTERFEROMETER WITH ADAPTIVE LAUNCH DIRECTION AND/OR POSITION

(71) Applicant: Honeywell International Inc., Morristown, NJ (US)

(72) Inventors: Robert Compton, Plymouth, MN (US); Kenneth Salit, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 695 days.

(21) Appl. No.: 13/758,309

(22) Filed: Feb. 4, 2013

(65) Prior Publication Data

US 2013/0213135 A1   Aug. 22, 2013

Related U.S. Application Data

(60) Provisional application No. 61/600,274, filed on Feb. 17, 2012.

(51) Int. Cl.

| G01C 19/58 | (2006.01) |
|---|---|
| G01P 15/08 | (2006.01) |
| G01V 7/00 | (2006.01) |
| G01P 15/02 | (2013.01) |
| G21K 1/00 | (2006.01) |
| H05H 3/02 | (2006.01) |

(52) U.S. Cl.
CPC .............. *G01P 15/02* (2013.01); *G01C 19/58* (2013.01); *G01P 15/08* (2013.01); *G21K 1/006* (2013.01); *H05H 3/02* (2013.01); *G01V 7/00* (2013.01)

(58) Field of Classification Search
CPC ........ H05H 3/02; G01P 15/02; G21K 1/006; G01C 19/58; G01V 7/00

USPC ............... 250/251, 256; 356/450, 459, 460; 73/382 R, 382 G, 514.01
See application file for complete search history.

(56) References Cited

U.S. PATENT DOCUMENTS

| 3,761,721 | A | 9/1973 | Altshuler et al. | |
|---|---|---|---|---|
| 4,992,656 | A | 2/1991 | Clauser | |
| 5,274,231 | A | 12/1993 | Chu et al. | |
| 6,314,809 | B1 * | 11/2001 | Kasevich | G01V 7/00 |
| | | | | 73/382 R |
| 6,476,383 | B1 * | 11/2002 | Esslinger | G21K 1/00 |
| | | | | 250/251 |
| 7,847,924 | B2 | 12/2010 | Aarons et al. | |

(Continued)

FOREIGN PATENT DOCUMENTS

WO    2012090134    7/2012

OTHER PUBLICATIONS

European Patent Office, "Communication under Rule 71(3)", "from Foreign Counterpart to U.S. Appl. No. 13/758,309", May 19, 2015, pp. 1-34, Published in: EP.

(Continued)

*Primary Examiner* — Nicole Ippolito
*Assistant Examiner* — Sean Luck
(74) *Attorney, Agent, or Firm* — Fogg & Powers LLC

(57) ABSTRACT

Embodiments described herein provide for a method of launching atoms in an atom interferometer. The method includes determining a direction of the total effective acceleration force on the atoms, controlling a direction of launch of the atoms for measurement in the atom interferometer based on the direction of the total effective acceleration force, and obtaining measurements from the atoms.

16 Claims, 9 Drawing Sheets

(56) References Cited

U.S. PATENT DOCUMENTS

| | | | |
|---|---|---|---|
| 2009/0242743 A1 | 10/2009 | Bouyer et al. | |
| 2010/0149541 A1* | 6/2010 | Aarons | G01C 19/58 356/450 |
| 2010/0312468 A1* | 12/2010 | Withanawasam | B81B 7/02 701/408 |
| 2011/0073753 A1* | 3/2011 | Bouyer | G01C 19/58 250/251 |

OTHER PUBLICATIONS

European Patent Office, "European Search Report", "from Foreign Counterpart of U.S. Appl. No. 13/758,309", May 31, 2013, pp. 1-5, Published in: EP.

Wu, "Gravity Gradient Survey with a Mobile Atom Interferometer", Mar. 2009, pp. 1-160, Publisher: Xinan Wu.

Peters et al., "High-Precision Gravity Measurements Using Atom interferometry", "Metrologia", Jun. 2001, pp. 25-61, vol. 38.

Schmidt et al., "A Mobile High-Presicion Absolute Gravimeter Based on Atom Interferometry", "Gyroscopy and Navigation", Apr. 21, 2011, vol. 2, No. 3.

Geiger et al., "Detecting inertial effects with airborne matter-wave interferometry", "Nature Communications", Sep. 20, 2011, pp. 1-7.

European Patent Office, "Office Action", "from Foreign Counterpart of U.S. Appl. No. 13/758,309", Jul. 9, 2013, pp. 1-5, Published in: EP.

European Patent Office, "Extended European Search Report from EP Application No. 15176004.8 mailed Oct. 16, 2015", from Foreign Counterpart of U.S. Appl. No. 13/758,309, Oct. 16, 2015, pp. 1-9, Published in: EP.

Yver-Leduc et al., "Reaching the Quantum Noise Limit in a High-Sensitivity Cold-Atom Inertial Sensor", "Journal of Optics B: Quantum and Semiclassical Optics", Apr. 2, 2003, pp. S136-S142, Publisher: Institute of Physics Publishing, Published in: UK.

* cited by examiner

ATOM INTERFEROMETER WITH ADAPTIVE LAUNCH DIRECTION AND/OR POSITION

CROSS-REFERENCE TO RELATED APPLICATIONS

This application claims the benefit of U.S. Provisional Application No. 61/600,274, filed on Feb. 17, 2012, which is incorporated herein by reference in its entirety.

BACKGROUND

Atom interferometers can be used as the basis for high precision inertial sensors, including both accelerometers and gyroscopes. High stability can be obtained when the atoms are released from trapping fields and allowed to evolve in free space, where they are manipulated and probed at intervals by laser light. The release of the atoms is also referred to herein as the launch or drop of the atoms.

SUMMARY

Embodiments described herein provide for a method of launching atoms in an atom interferometer. The method includes determining a direction of the total effective acceleration force on the atoms, controlling a direction of launch of the atoms for measurement in the atom interferometer based on the direction of the total effective acceleration force, and obtaining measurements from the atoms.

Other embodiments described herein provide for another method of launching atoms in an atom interferometer. This method includes determining a predicted trajectory of atoms for measurement in the atom interferometer after launch, controlling a position of launch of the atoms within a volume of a Raman laser beam based on the predicted trajectory, and obtaining measurements from the atoms.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Figure 1:
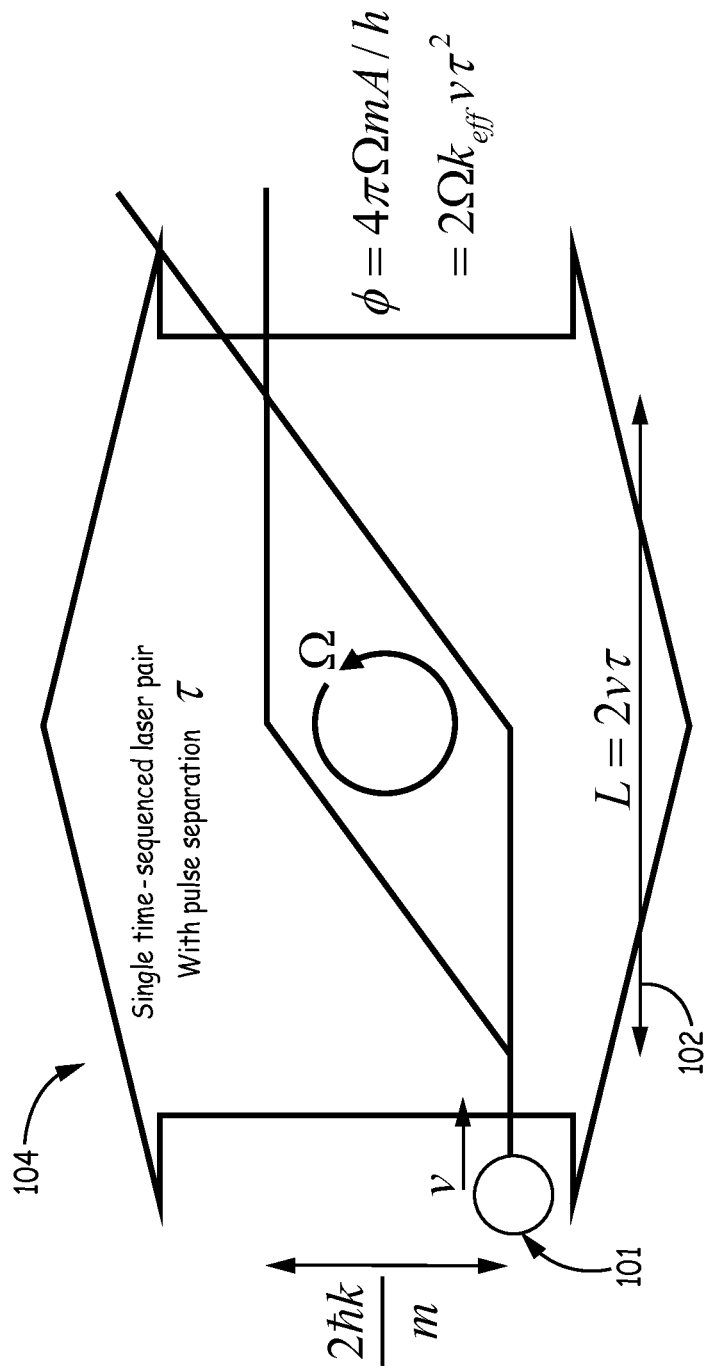
FIG. 1 is a diagram illustrating an example of operation of a miniature atom interferometer.

FIG. 1 is a diagram illustrating an example of operation of a miniature atom interferometer. In operation of such an atom interferometer, atoms 101 are prepared by laser cooling techniques, which reduce the center of mass velocity of each atom in the diffuse gas of atoms 101. The result is a small cloud of cold atoms 101 at the center of a set of overlapping laser beams. Laser cooling techniques can include both magneto-optical trapping and optical molasses.

Once the atoms 101 have been cooled, the atoms 101 can be launched from a location that is within a volume 102 through which a Raman laser beam 104 propagates when activated. In the launch phase, it is possible to accelerate the center of mass of the entire cloud of atoms, without varying the relative velocity of the individual atoms within the cloud. In an example, a single Raman laser beam 104 performs all interrogation of atoms 101 and is pulsed three times. After launch, the Raman laser beam 104 is pulsed a first time to impart momentum to half of each atom in the atoms 101. After launch, a first time period (tau) is allowed to pass. The first time period (tau) can be selected such that the atoms 101 will still be within the volume 102 after double the first time period. At the end of the first time period (tau), the Raman laser beam 104 is pulsed again (second pulse) to reverse the momentum of each atom 101. After the second pulse, a second time period (tau) equal to the first time period is allowed to pass. At the end of the second time period, the Raman laser beam 104 is pulsed a third time to recombine the atoms 101. The phase of the recombined atoms 101 can be read out to obtain a reading of any inertial effects (e.g., rotation, acceleration) affecting the atoms 101 while split.

When the sensor is under gravitation or other acceleration the atoms 101 will travel with respect to the walls of the atom interferometer, limiting the time available for interrogation. Further, this travel with respect to the walls will introduce bias and scale factor errors, since the alignment of the atoms 101 with respect to the laser light will not be well maintained. In particular, the time available for interrogation is limited based on the time in which the atoms 101 are within the volume 102 of the Raman laser beam 104. In many examples, the volume 102 of the Raman laser beam 104 is a few millimeters in diameter which limits the interrogation time to tens of milliseconds.

In an example, the direction of launch of the atoms 101 is controlled based on the direction of a total effective acceleration force on the atom interferometer. In particular, the direction of launch of the atoms 101 can be adaptively selected based on the direction of the total effective acceleration force on the atom interferometer at a given moment.

For example, the direction of launch of the atoms 101 can be adaptively selected to be substantially opposite the current direction of the total effective acceleration force on the atoms 101 in the atom interferometer. Setting the direction of launch of the atoms 101 as substantially opposite the current direction of the total effective acceleration force can aid in lengthening the time period for interrogation. A longer time period for interrogation of the atoms 101 may be desirable, because longer time periods can result in greater sensitivity for the atom interferometer. Launching the atoms 101 in a direction that is substantially opposite the direction of the total effective acceleration force on the atoms 101 causes the total effective acceleration force to slow the atoms 101, and therefore, lengthen the amount of time the atoms 101 are within the volume 102 of the Raman laser beam 104.

In another example, the direction of launch of the atoms 101 can be adaptively selected to be substantially orthogonal to the total effective acceleration force on the atoms 101. Setting the direction of launch of the atoms 101 as substantially orthogonal to the current direction of the total effective acceleration force can aid in increasing the sensitivity of the atom interferometer. This is because if the atoms 101 are launched orthogonal to the total effective acceleration force, the acceleration force will have the most lateral affect on the atoms 101.

Some conventional atom interferometers are configured to launch in a direction generally opposite of gravity. However, such conventional atom interferometers are stationary devices where the direction of gravity affecting the interferometer is known beforehand. As such, these conventional atom interferometers can be configured to be placed in a certain manner and launch in a direction that is generally opposite of gravity.

The subject matter described and claimed herein, in contrast, enables adaptively controlling the direction of launch of the atoms 101 based on the total effective acceleration force on the atom interferometer at a given moment. This is advantageous for situations where the direction in which gravity affects the atom interferometer is unknown ahead of time, such as when the atom interferometer may be in one of various orientations. It is also advantageous for situations where the atom interferometer is under acceleration other than or in addition to gravity, such as when the atom interferometer is on an aircraft. It may also be advantageous for situations in which very high precision measurements are desired, such that the exact local direction of gravity is taken into account.

Figure 2:
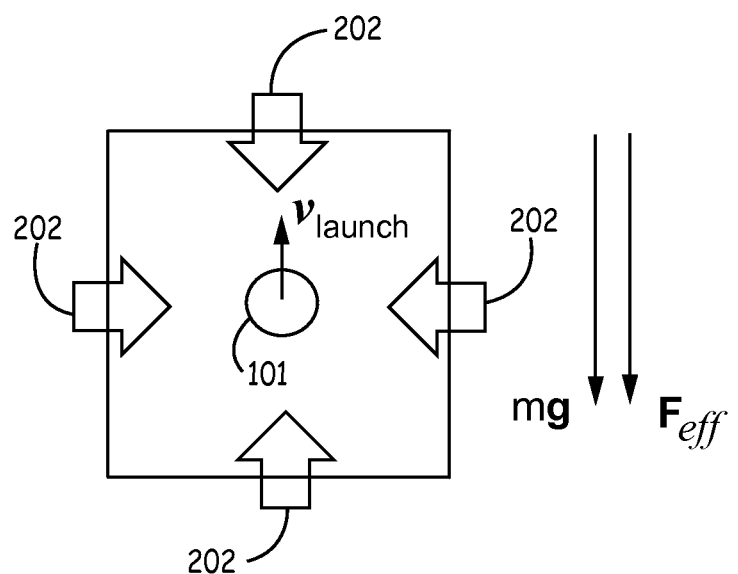
FIG. 2 is a diagram of example launching of atoms in an atomic interferometer at rest in a gravitational field.

FIG. 2 is a diagram showing an example launching of the atoms 101 in an atom interferometer. FIG. 2 illustrates a situation in which the atom interferometer is at rest within a gravitational field. As shown, the direction of the total effective acceleration force, Feff, on the atoms 101 is aligned with the direction of gravity, mg, since the atom interferometer is at rest. As shown, the atoms 101 are launched in a direction substantially opposite the direction of the total effective acceleration force. In this example, gravity is the only acceleration force (i.e., the atom interferometer is not under acceleration), and the direction of launch is therefore substantially opposite to the direction of gravity. After launch, the force of gravity slows the atoms 101, thereby lengthening the time in which the atoms 101 are within the volume 102 of the Raman laser beam 104.

Figure 3:
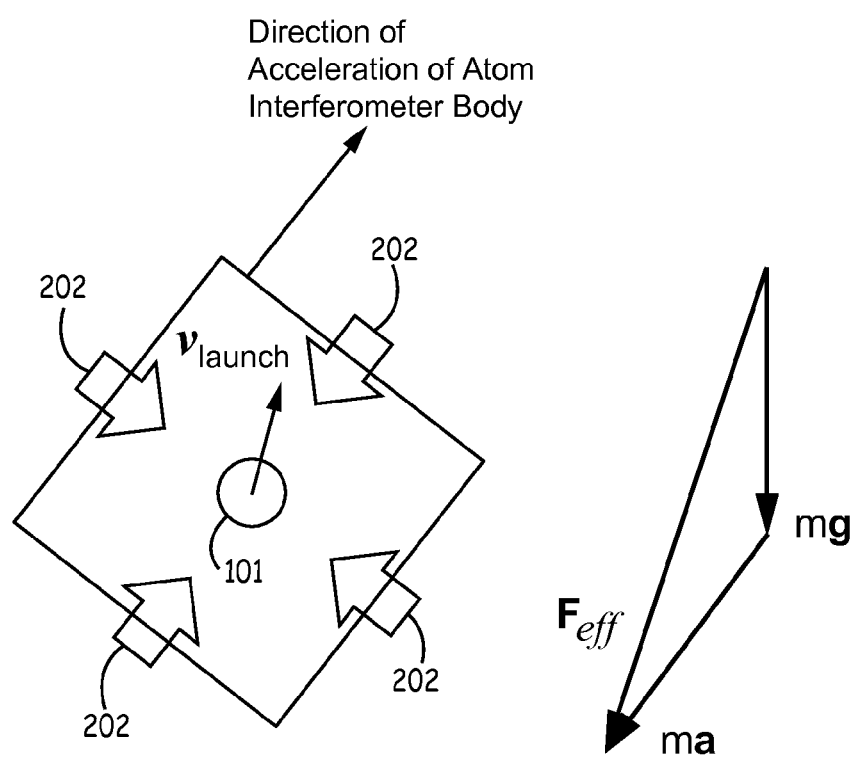
FIG. 3 is a diagram of example launching of atoms in an atomic interferometer under acceleration and in a gravitational field.

FIG. 3 is a diagram showing an example launching of the atoms 101 in an atom interferometer that is under acceleration and within a gravitational field. As shown, the atoms 101 experience the force of gravity (mass×gravity, mg), and force from acceleration (mass×acceleration, ma). The force of acceleration, ma, shown here and described herein is the effective force on the atoms 101 with respect to the body of the atom interferometer. In other words, to achieve the effective acceleration force, ma, on the atoms 101, the body of the atom interferometer is accelerating at an amount equal to a, and in a direction opposite the vector, ma, shown in FIG. 3.

The total effective acceleration force, Feff, on the atoms 101 is equal to the force of gravity, mg, plus the force from acceleration, ma. Accordingly, the direction of the total effective acceleration force, Feff, is based on the direction of gravity, mg, and the direction of the acceleration force on the atoms 101, ma. As shown, the atoms 101 are launched in a direction opposite to the total effective acceleration force. The total effective acceleration force, Feff, slows the atoms 101, thereby lengthening the time in which the atoms 101 are within the volume 102 of the Raman laser beam 104.

Figure 4:
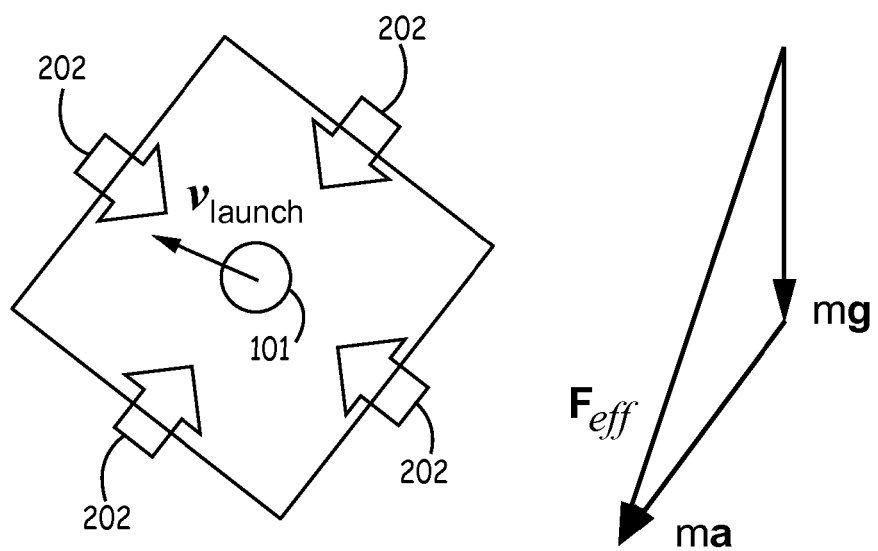
FIG. 4 is a diagram of example launching of atoms in a direction that is substantially orthogonal to the total effective acceleration force on the atoms.

FIG. 4 is a diagram showing an example launching of the atoms 101 where the atoms are launched in a direction that is substantially orthogonal to the total effective acceleration force on the atoms 101. As shown, the atoms 101 experience the force of gravity (mass×gravity, mg), and the force from acceleration (mass×acceleration, ma). The total effective acceleration force, Feff, is equal to the force of gravity, mg, plus the force from acceleration, ma. In this example, the direction of launch of the atoms 101 is substantially orthogonal to the direction of the total effective acceleration force.

Figure 5:
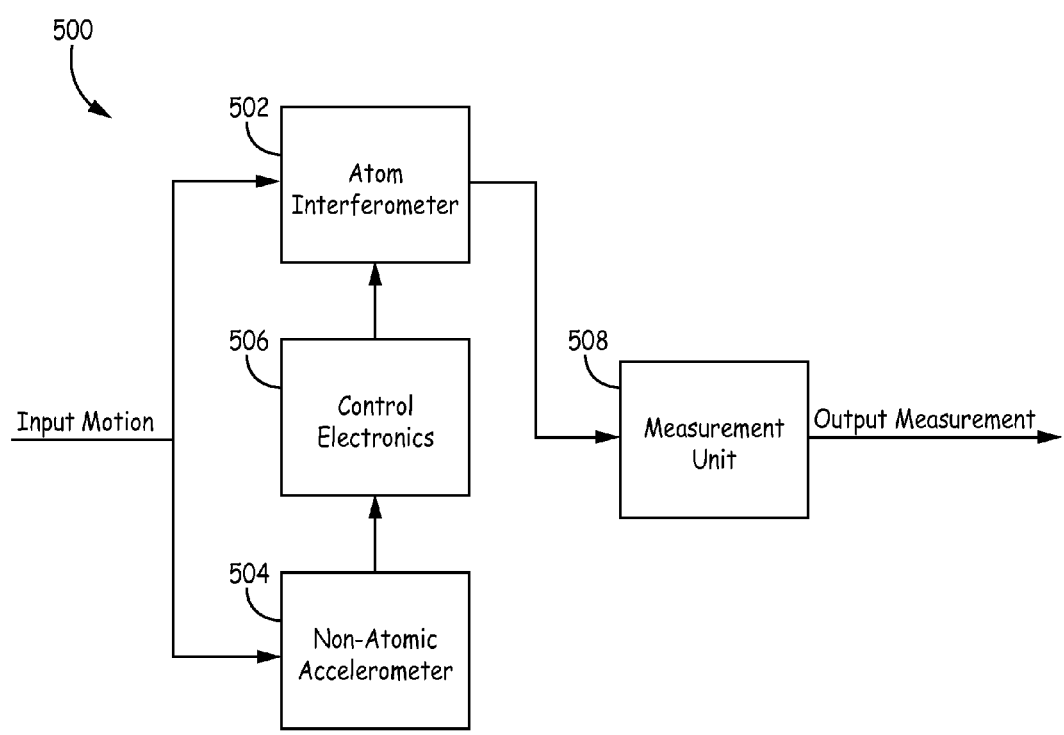
FIG. 5 is a block diagram of an example system including an atom interferometer having an adaptively controlled launch direction of the atoms.

FIG. 5 is a block diagram of an example system 500 including an atom interferometer 502 having an adaptively controlled launch direction of the atoms 101. In this example, the system 500 includes a non-atomic type accelerometer 504 that is subject to the same input motion as the atom interferometer 502 to determine the direction of the total effective acceleration force on the atoms 101. Readings can be obtained from the non-atomic type accelerometer 504 and provided to the control electronics 506.

The control electronics 506 can control the direction of the launch of the atoms 101 based on a total effective acceleration force determined from the readings of the non-atomic type accelerometer 504. For example, the direction of launch of the atoms 101 can be set as opposite or orthogonal to the direction of acceleration force as sensed by the non-atomic type accelerometer 504 as discussed above. Since the non-atomic type accelerometer 504 can have a higher bandwidth than the atom interferometer 502, determining the direction based on the readings from the non-atomic type accelerometer 504 can enable rapid estimation of changes in the total effective acceleration force. The readings from the atom interferometer 502 can be sent to a measurement unit 508 for determination of an output measurement (e.g., an acceleration or rotation) therefrom. The atom interferometer 502 can be configured to obtain readings corresponding to acceleration (as an accelerometer) or rotation (as a gyroscope). The non-atomic type accelerometer 504 can comprise a micro-electro-mechanical system (MEMS) vibratory structure accelerometer (e.g., a proof mass based accelerometer) or other non-atomic type accelerometer. Although a single atom interferometer 502 and a single non-atomic type accelerometer 504 are shown, it should be understood that a given system can include multiple atom interferometers 502 and/or multiple non-atomic type accelerometers 504 operating in a similar manner to that described herein. In some examples, the control electronics 506 and the measurement unit 508 or portions thereof can be implemented in the same hardware and/or software.

Figure 6:
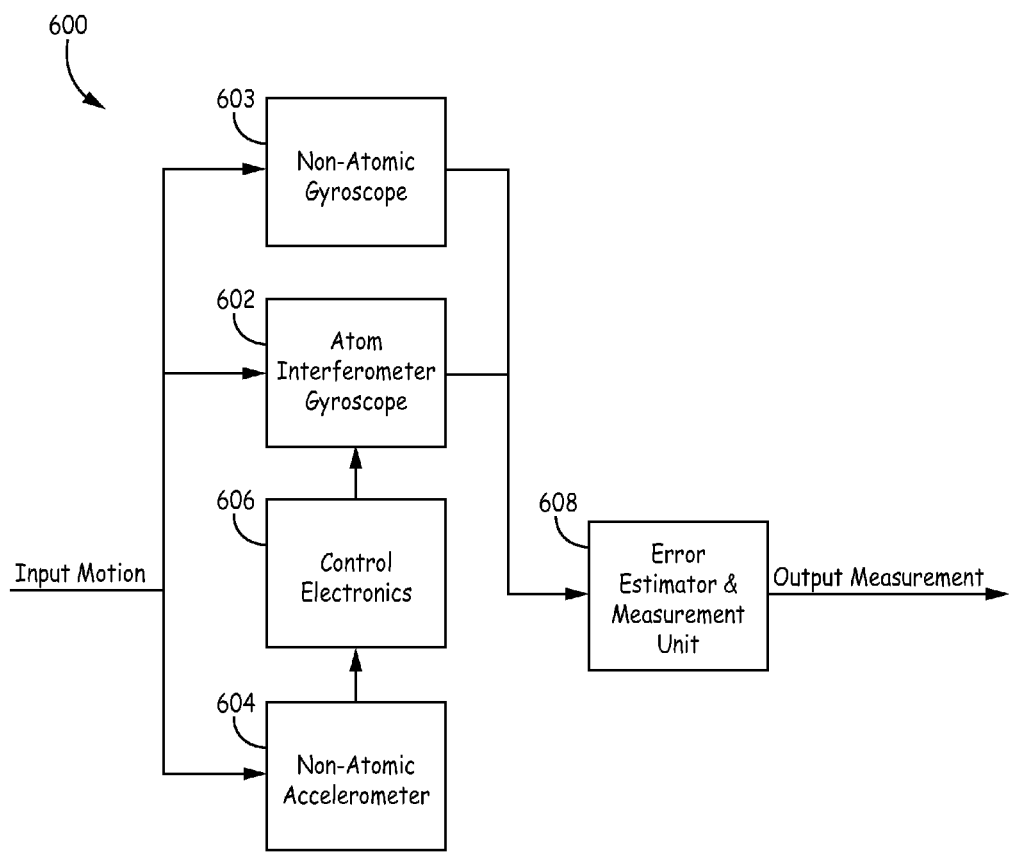
FIG. 6 is a block diagram of an example system including an atom interferometer gyroscope that is part of a complementary inertial measurement unit that includes a non-atomic type gyroscope.

FIG. 6 is a block diagram of an example system 600 including an atom interferometer gyroscope 602 that is part of a complementary inertial measurement unit. An example complementary inertial measurement unit is described in the U.S. patent application Ser. No. 13/758,370, titled "Closed Loop Atomic Inertial Sensor". A complementary inertial measurement unit includes a non-atomic type inertial sensor 603 along with the atom interferometer 602 subject to the same input motion. The complementary inertial measurement unit also includes an appropriate measurement unit 608 to calculate an output measurement based on the readings from both the atom interferometer 602 and the non-atomic type inertial sensor 603. The complementary inertial measurement unit can include a plurality of atom interferometer gyroscopes and accelerometers, and a plurality of non-atomic type gyroscopes and accelerometers. For simplicity, FIG. 6 illustrates a single atom interferometer 602 that is configured to obtain readings corresponding to rotation as a gyroscope and a non-atomic inertial sensor 603 that is part of the complementary inertial measurement unit and is likewise a gyroscope. Other gyroscopes and accelerometers can also be included in the complementary inertial measurement unit. The non-atomic type inertial sensor can include a MEMS vibratory structure inertial sensor (e.g., a tuning fork, piezoelectric, or wine glass gyroscope, or a proof mass based accelerometer), an optical inertial sensor (e.g., a ring laser gyroscope, resonant fiber optic gyroscope (RFOG), an interferometer fiber optic gyroscope (IFOG)), or other non-atomic type inertial sensor.

A complementary inertial measurement unit can be used to balance dynamic range with high stability. This is because a non-atomic type inertial sensor 603 can provide a continuous output with a bandwidth of a few hundred Hertz. Measurement cycles for the atom interferometer 602, however, use a sample of atoms 101 that is prepared, launched, manipulated, and finally probed; a cycle that can last upwards of tens of milliseconds. The sensitivity of such an atom interferometer 602 can be determined based on the time between launch and final readout probe. By integrating a non-atomic type inertial sensor 603 with an atom interferometer 602 in a complementary inertial measurement unit, the low stability, high bandwidth non-atomic inertial sensor 603 can be stabilized periodically by the high stability, low bandwidth atom interferometer 602. Additionally, the atom interferometer 602 can be further stabilized by controlling the direction of launch of the atoms 101 with the control electronics 606 in any of the manners described herein, such as based on readings from a non-atomic type accelerometer 604 that is subject to the same input motion as the atom interferometer 602, but is not part of the complementary inertial measurement unit. In some examples, the control electronics 606 and the measurement unit 608 or portions thereof can be implemented in the same hardware and/or software.

Figure 7:
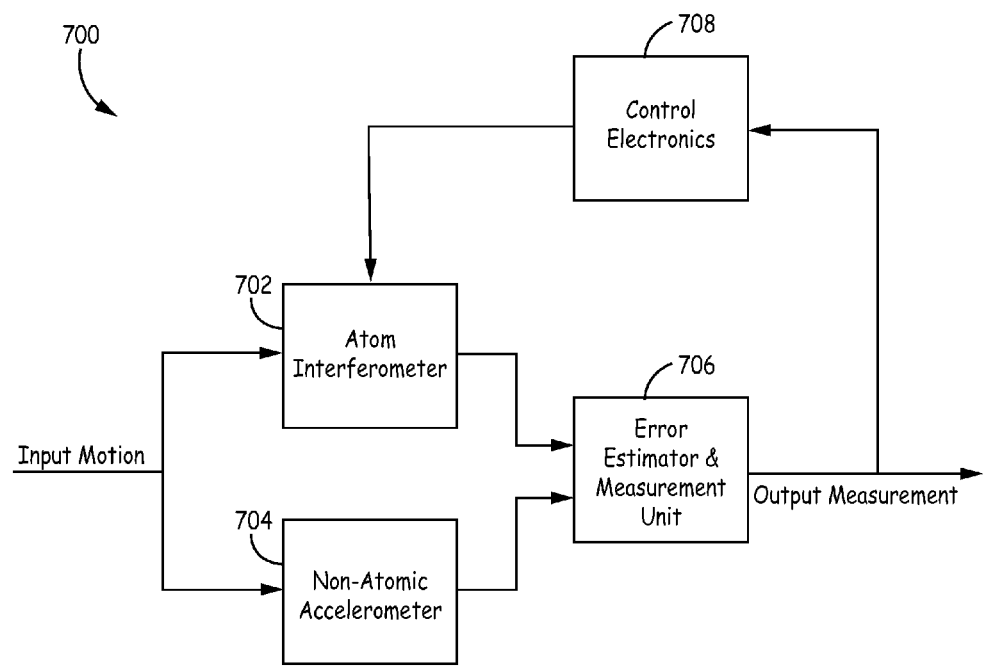
FIG. 7 is a block diagram of an example system including an atom interferometer that is part of a complementary inertial measurement unit that includes a non-atomic type accelerometer, wherein the direction of launch of the atoms in the atom interferometer are controlled based on output measurements from the complementary inertial measurement unit.

FIG. 7 is a block diagram of an example system 700 including an atom interferometer accelerometer 702 that is part of a complementary inertial measurement, wherein the direction of launch of the atoms 101 in the atom interferometer 702 are controlled based on output measurements from the complementary inertial measurement unit. As a complementary inertial measurement unit the atom interferometer 702 and the non-atomic type accelerometer 704 are subject to the same input motion. Although only a single atom interferometer 702 and a single non-atomic type accelerometer 704 are shown, the complementary inertial sensor can include a plurality of atom interferometer gyroscopes and accelerometers, and a plurality of non-atomic type gyroscopes and accelerometers. The non-atomic type accelerometer 704 can comprise a MEMS vibratory structure accelerometer (e.g., a proof mass based accelerometer) or other non-atomic type accelerometer.

In this example, a current reading or readings from the non-atomic type accelerometer 704 can be combined with one or more previous readings from the atomic interferometer 702 (as well as other sensors of the complementary inertial measurement unit) by a measurement unit 706 to determine the direction of the total effective acceleration force. Such a combination of readings can adjust for the scale factor and bias of the non-atomic type accelerometer 704 based on the one or more previous readings of the atomic interferometer 702 in the manner of a complementary inertial measurement unit as described above with respect to FIG. 6. That is, a reading taken at a first time by the non-atomic type inertial sensor can be combined with a reading (e.g., the most recent reading) or readings taken at a time or times previous to the first time by the atom interferometer to determine the direction of the total effective acceleration force. The output measurement from the measurement unit 706 can be sent to control electronics 708 to control the direction of launch of the atoms 101 based thereon. In an example, the direction of launch of the atoms 101 can be set as opposite or orthogonal to the direction of the most recent acceleration force estimate from such a complementary inertial measurement unit. In some examples, the control electronics 708 and the measurement unit 706 or portions thereof can be implemented in the same hardware and/or software.

In yet another example, the direction of the total effective acceleration force can be determined from previous readings of the atom interferometer without using readings from a non-atomic type accelerometer. This example can be used when the atom interferometer is not part of a complementary inertial measurement unit. For example, the most recent reading from the atom interferometer can be used as the current total effective acceleration force. Accordingly, the direction of launch of the atoms 101 can be set as opposite or orthogonal to the direction of the most recent reading from the atom interferometer.

In operation, the total effective acceleration force can be determined and the launch of the atoms 101 in an atom interferometer (502, 602, 702) can be controlled by control electronics (506, 606, 708) adaptively. For example, a first determination of a first direction of the total effective acceleration force can be made at a first time. Such a first determination can be made based on readings from a non-atomic type inertial sensor and/or based on readings from the atom interferometer as discussed above.

Based on the first determination of the first direction of the total effective acceleration force, the atomic interferometer can perform a first launch of atoms 101 in a direction opposite or orthogonal to the first direction of the total effective acceleration force. At a second time, the atomic interferometer can make a second determination of a second direction of the total effective acceleration force. Such a second determination can be made based on readings from a non-atomic type inertial sensor and/or based on readings from the atom interferometer as discussed above.

Based on this second determination of the second direction of the total effective acceleration force, the atomic interferometer can perform a second launch of atoms 101 in a direction opposite or orthogonal to the second direction of the total effective acceleration force. Since acceleration forces on the atomic interferometer can change over time, the second direction of the total effective acceleration force may be different than the first direction of total effective acceleration force. Accordingly, the atom interferometer can adapt to changes in the direction of the total effective acceleration force by adjusting the direction of launch of the atoms 101. Thus, the atom interferometer can increase the length of time in which the atoms 101 are within the volume 102 even though the direction of the total effective acceleration force may change. In an example, the atom interferometer can adjust the direction of launch of the atoms 101 for each launch based on the current direction of the total effective acceleration force.

The direction of launch of the atoms 101 can be controlled by a set of optical molasses lasers 202 surrounding the atoms 101 during launch. The optical molasses lasers 202 can be strategically positioned around the atoms 101 such that different optical molasses lasers 202 can be incident upon the atoms 101 from different directions. By adjusting the light fields from different optical molasses lasers 202 based on the direction in which the optical molasses lasers 202 are incident upon the atoms 101, the direction of launch of the atoms 101 can be controlled. In an example, these optical molasses lasers 202 can be the same lasers used for cooling of the atoms 101 prior to launch. The optical molasses lasers 202 can include pairs of counterpropagating beams that can be tuned such that the beams differ slightly in wavelength. This difference in wavelength can transfer momentum to the atoms 101, resulting in a non-zero velocity along the direction of counterpropagating beams. In this way, the optical molasses lasers 202 can be used to launch the atoms 101 in a direction based on the direction of the total effective acceleration force. In an example, there are three pairs of counterpropagating beams (six total) surrounding the atoms 101 such that each pair of optical molasses lasers 202 comprises two lasers pointing in opposite directions, wherein each pair of optical molasses lasers 202 is oriented on one of three axis about the atoms 101. Thus, there is a laser pointing in each of the 6 orthogonal directions of the three axes. Each pair of beams can impart a component of acceleration on the atoms 101, depending on the frequency difference for that pair. The combination of the three pairs enables forces to be imparted in any direction.

In another example, the direction of launch of the atoms 101 can be controlled by a magneto-optical trap. In a magneto-optical trap, magnetically sensitive atoms are trapped at a low point in magnetic field, which can be created by anti-Helmholtz coils or another combination of coils that results in a zero field or low field point in space, for example a quadrupole field. Another magnetic field that is uniform in space can superimposed upon the quadrupole field to shift the low field point along the axis of the uniform field vector. The center of mass of the atom cloud will follow the zero field point. By varying the strength of the uniform field, the location of the zero field point, and therefore the center of mass of the atoms, can be controlled dynamically in such a way that a non-zero velocity can be imparted to the center of mass of the atoms, without increasing the relative average velocity of the atom cloud (the atoms are not heated by this action). This provides an alternative means to launching the atoms prior to performing interferometry. A combination of uniform fields along different orthogonal axes can provide arbitrary control over launch direction.

Figure 8:
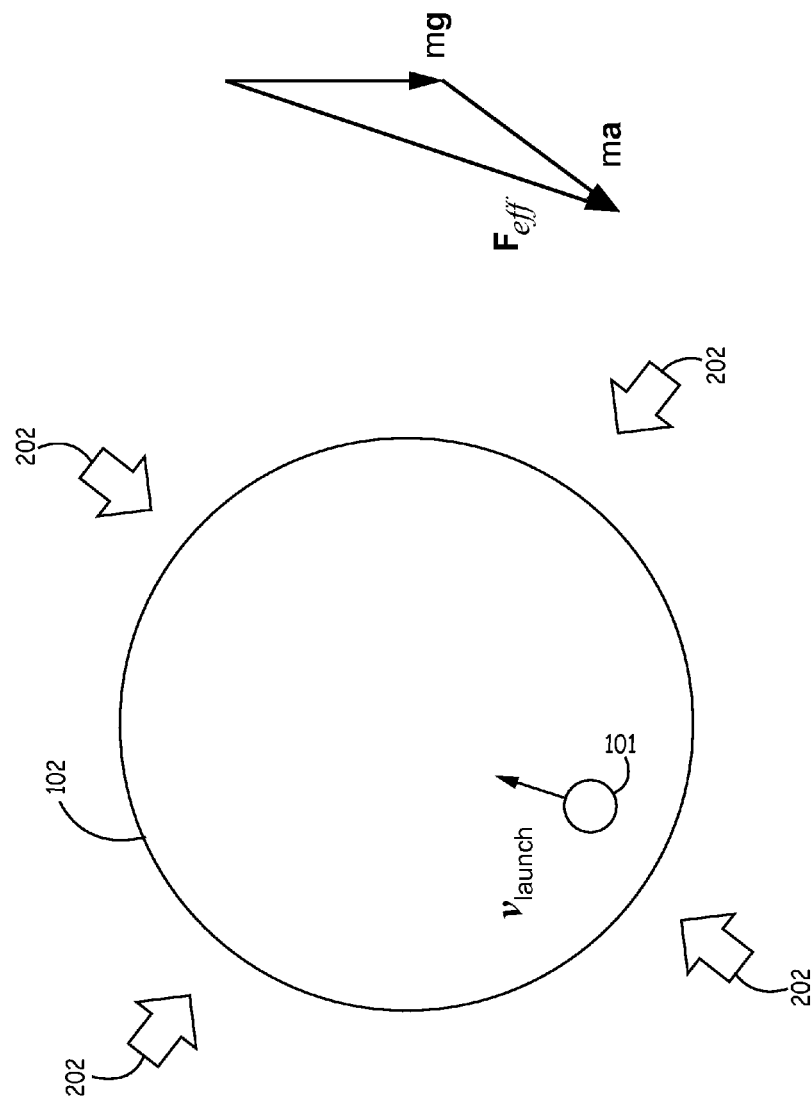
FIG. 8 is a diagram of an example launching of the atoms where the position of the atoms within the volume of the Raman laser beam at launch is adaptively controlled.

FIG. 8 is a diagram showing an example launching of the atoms 101 where the position of the atoms 101 within the volume 102 of the Raman laser beam 104 at launch is adaptively controlled by control electronics (506, 606, 708) in any of the example systems 500, 600, 700 described above. In an example, in addition to controlling the direction of the launch of the atoms 101, the atom interferometer can control the position of the atoms 101 at launch based on the predicted trajectory of the atoms 101 after launch. In particular, the position of the atoms 101 at launch can be set nearer an edge of the volume of the Raman laser beam that is substantially opposite the direction of the predicted trajectory of the atoms after launch.

The predicted trajectory can be determined based on the total effective acceleration force on the atom interferometer. For example, if the atom interferometer is under acceleration and/or under the effect of gravity, the predicted trajectory will likely be in the direction of the total effective acceleration force. Thus, to further increase the length of time in which the atoms 101 remain within the volume 102 of the Raman laser beam 104, the atoms 101 can be launched from a position that is nearer the "lower" edge of the volume 102 of the Raman laser beam 104, where lower is relative to the direction of the total effective acceleration force. That is, the position of the atoms 101 can be set nearer an edge of the volume of the Raman laser beam that is in the direction of the total effective acceleration force as shown in FIG. 8. Thus, the atoms 101 if launched in a direction opposite the total effective acceleration force have more linear distance to travel across the Raman laser beam 104 as compared to being launched in the center of the volume 102. The position of the atoms 101 can be controlled adaptively similar to the adaptive control for the direction of launch discussed above. That is, the position of the atoms 101 can be set for each launch such that the atoms 101 are nearer the "lower" edge of the volume 102 in accordance with the current direction of the total effective acceleration force.

In the example shown in FIG. 8, the atom interferometer experiences the force of gravity (mass×gravity, mg), and the force from acceleration (mass×acceleration, ma). The total effective acceleration force, Feff, is equal to the force of gravity, mg, plus the force from acceleration, ma. In this example, the direction of launch of the atoms 101 is substantially opposite to the direction of gravity, and the position of the atoms 101 at launch is controlled such that the atoms 101 are near the edge of the volume 102 that is in the direction of the total effective acceleration force.

In the example shown in FIG. 2, the direction of the total effective acceleration force is downward on the page. In such an example, the atoms 101 can be launched opposite the direction of the total effective acceleration force which, in the example of FIG. 2, is upwards on the page. The atoms 101 can also be placed nearer the edge of the volume 102 of the Raman laser beam 104 that is opposite the direction of launch. That is, using the direction of launch as a reference, the atoms 101 can be placed near the edge of the Raman laser beam 104 that is behind the direction of launch, which in the example of FIG. 2 would be near the bottom of the volume 102 as shown in FIG. 2.

Figure 9:
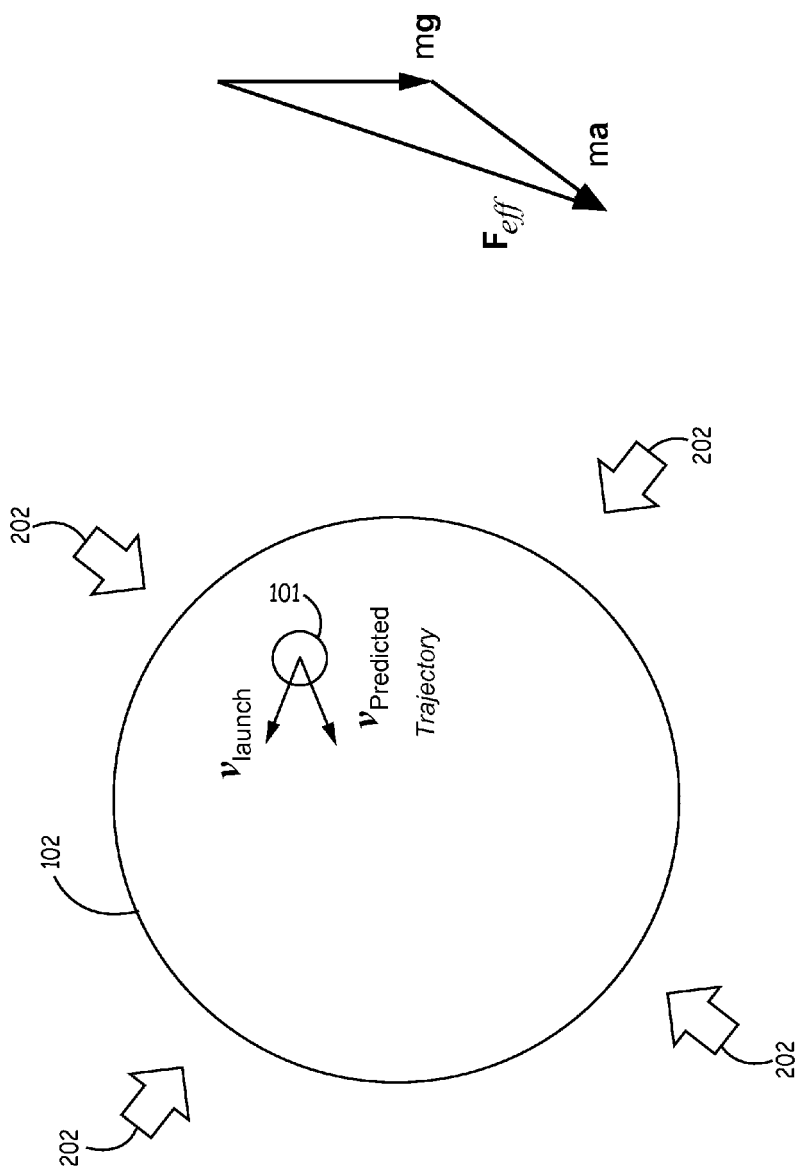
FIG. 9 is a diagram showing another example launching of the atoms where the position of the atoms within the volume of the Raman laser beam at launch is adaptively controlled.

FIG. 9 is a diagram showing another example launching of the atoms 101 where the position of the atoms 101 within the volume 102 of the Raman laser beam 104 at launch is adaptively controlled. In some examples, other factors in addition to the direction of launch can be used to determine the predicted trajectory of the atoms 101 and, therefore, to determine position of the atoms 101 at launch. For example, when the atoms 101 are launched in a direction orthogonal to the direction of the total effective acceleration force as shown in FIG. 9, the direction of launch can be set near the edge of the volume 102 opposite of (i.e., behind) the direction of the predicted trajectory for the atoms 101. In such an example, the predicted trajectory of the atoms 101 after launch may be along a vector between the direction of the total effective acceleration force and the direction of the launch. The position of the atoms 101 at launch, therefore, can be set near the edge of the volume 102 that is opposite such a vector of predicted trajectory.

In an example, the predicted trajectory can be used to position of the atoms 101 at launch in order to reduce errors such as errors due to non-homogenous light fields. Since the Raman laser beam 104 has a Gaussian intensity profile, the atoms 101 can receive a different light intensity depending on their radial distance from the optical axis. The trajectory of the atoms 101 after launch can be predicted based on the total effective acceleration force on the atom interferometer and, in some examples, the launch direction as discussed above. Based on the predicted trajectory, the location of launch of the atoms 101 can be selected to control the location of the atoms 101 when the pulses of the Raman laser occur. For example, the atoms 101 can be launched such that they are near an upper edge with respect to the direction of predicted trajectory after the moment of launch. Within the volume 102 of the Raman laser beam near such an upper edge, the position of the atoms 101 can be selected such that the atoms 101 are near $1/e^2$ of the radius of the volume 102 when the first (pi/2) pulse of the Raman laser occurs. The second pulse can be timed such that the atoms 101 are near $1/e^2$ of the radius of the volume 102 on the lower edge (opposite the upper edge) when the second (pi) pulse occurs. The atoms 102 should then be back near $1/e^2$ of the radius on the upper edge when the final (pi/2) pulse occurs. In this way, the atoms 101 will receive approximately the same intensity from the Raman laser pulses.

In an example, the position of the atoms 101 can be adaptively controlled in any of the manners described above, and the launch direction of the atoms 101 is not adaptively controlled based on the total effective acceleration force. In an implementation of such an example, the launch direction of the atoms 101 can remain constant over different launches while the position of the atoms 101 at launch can be adaptively controlled based on the total effective acceleration force or the predicted trajectory of the atoms after launch.

In an example, the position of the atoms 101 can be controlled with a magneto optical trap. Such a magneto optical trap holds the atoms 101 at the magnetic zero of an anti-Helmholtz field. The position of the atoms 101 can be controlled by appropriately controlling the magnetic field to adjust the location of the magnetic zero.

In an example, the intensity of the Raman laser beam 104 can be varied based on the predicted trajectory to aid in the atoms 101 receiving a uniform light intensity from the Raman laser pulses.

EXAMPLE EMBODIMENTS

Example 1 includes a method of launching atoms in an atom interferometer, the method comprising: determining a direction of the total effective acceleration force on the atoms; controlling a direction of launch of the atoms for measurement in the atom interferometer based on the direction of the total effective acceleration force; and obtaining measurements from the atoms.

Example 2 includes the method of Example 1, wherein the total effective acceleration force includes the force of gravity and any other acceleration forces on the atoms.

Example 3 includes the method of Example 2, wherein the other acceleration forces on the atoms are forces with respect to the body of the atom interferometer.

Example 4 includes the method of any of Examples 1-3, wherein determining a direction of the total effective acceleration force includes determining a direction of the total effective acceleration force using readings from a micro-electro-mechanical system (MEMS) vibratory structure accelerometer.

Example 5 includes the method of Example 4, wherein determining a direction of the total effective acceleration force includes determining a direction of the total effective acceleration force based on a combination of readings from the MEMS vibratory structure accelerometer and the atom interferometer.

Example 6 includes the method of any of Examples 1-5, comprising: repeating the acts of determining a direction, controlling the direction of launch of atoms, and obtaining measurements for subsequent atom launches such that the direction of an atom launch is adaptively determined based on an estimate of a current direction of the total effective acceleration force on the atom interferometer.

Example 7 includes the method of any of Examples 1-6, wherein controlling the direction of launch of atoms includes setting the direction of launch substantially opposite to the direction of the total effective acceleration force.

Example 8 includes the method of any of Examples 1-7, wherein controlling the direction of launch of atoms includes setting the direction of launch substantially orthogonal to the direction of the total effective acceleration force.

Example 9 includes the method of any of Examples 1-8, comprising: controlling the position of launch of the atoms within a volume of a Raman laser beam to be nearer an edge of the volume of the Raman laser beam that is substantially opposite the direction of the predicted trajectory of the atoms based on a predicted trajectory of the atoms after launch.

Example 10 includes the method of Example 9, wherein the direction of the predicted trajectory of the atoms is based on the direction of launch of the atoms and the total effective acceleration force.

Example 11 includes the method of any of Examples 9 or 10, wherein controlling the position of launch of the atoms includes setting the position of the atoms near $1/e^2$ of a radius of the volume of the Raman laser beam when the first pulse of the Raman laser occurs.

Example 12 includes a method of launching atoms in an atom interferometer, the method comprising: determining a predicted trajectory of atoms for measurement in the atom interferometer after launch; controlling a position of launch of the atoms within a volume of a Raman laser beam based on the predicted trajectory; and obtaining measurements from the atoms.

Example 13 includes the method of Example 12, wherein controlling the position of launch of the atoms includes setting the position of launch nearer an edge of the volume of the Raman laser beam that is substantially opposite the direction of the predicted trajectory of the atoms.

Example 14 includes the method of Example 13, wherein the direction of the predicted trajectory of the atoms is based on a direction of a total effective acceleration force on the atoms and a direction of launch of the atoms.

Example 15 includes the method of Example 14, wherein the total effective acceleration force includes the force of gravity and any other acceleration forces on the atoms.

Example 16 includes the method of any of Examples 13-15, wherein controlling the position of launch of the atoms includes setting the position of the atoms near $1/e^2$ of a radius of the volume of the Raman laser beam when the first pulse of the Raman laser occurs.

Example 17 includes an inertial sensor comprising: an atom interferometer configured to launch atoms and obtain readings therefrom; a non-atomic type accelerometer that is subject to the same input motion as the atom interferometer; and control and measurement electronics configured to: determine a direction of a total effective acceleration force on the atoms in the atom interferometer based on readings from the non-atomic type accelerometer; control a direction of launch of the atoms in the atom interferometer based on the direction of the total effective acceleration force; and obtain output measurements based on the readings from the atom interferometer.

Example 18 includes the inertial sensor of Example 17, wherein the atom interferometer is configured to obtain readings corresponding to one of acceleration or rotation.

Example 19 includes the inertial sensor of any of Examples 17 or 18, comprising: a non-atomic type gyroscope that is subject to the same input motion as the atom interferometer; and wherein the control and measurement electronics are configured to obtain output measurements based a combination of the readings from the atom interferometer and the non-atomic type gyroscope.

Example 20 includes the inertial sensor of any of Examples 17-19, wherein the control and measurement electronics are configured to obtain output measurements based a combination of the readings from the atom interferometer and the non-atomic type accelerometer, wherein the atom interferometer is configured to obtain readings corresponding to acceleration.

What is claimed is:

1. A method of launching atoms in an atom interferometer, the method comprising:
    determining a direction of the total effective acceleration force on the atoms;
    controlling a direction of launch of the atoms for measurement in the atom interferometer based on the direction of the total effective acceleration force using one or both of a set of optical molasses lasers and a magneto-optical trap, wherein controlling the direction of launch includes adjusting the direction relative to a volume of the Raman laser beam to increase the amount of time the atoms are available for interrogation by the Raman laser beam; and
    obtaining measurements from the atoms.

2. The method of claim 1, wherein the total effective acceleration force includes the force of gravity and any other acceleration forces on the atoms.

3. The method of claim 2, wherein the other acceleration forces on the atoms are forces with respect to the body of the atom interferometer.

4. The method of claim 1, wherein determining a direction of the total effective acceleration force includes determining a direction of the total effective acceleration force using readings from a micro-electro-mechanical system (MEMS) vibratory structure accelerometer.

5. The method of claim 4, wherein determining a direction of the total effective acceleration force includes determining a direction of the total effective acceleration force based on a combination of readings from the MEMS vibratory structure accelerometer and the atom interferometer.

6. The method of claim 1, comprising:
    repeating the acts of determining a direction, controlling the direction of launch of atoms, and obtaining measurements for subsequent atom launches such that the direction of an atom launch is adaptively determined based on an estimate of a current direction of the total effective acceleration force on the atom interferometer.

7. The method of claim 1, wherein controlling the direction of launch of atoms includes setting the direction of launch opposite to the direction of the total effective acceleration force.

8. The method of claim 1, wherein controlling the direction of launch of atoms includes setting the direction of launch orthogonal to the direction of the total effective acceleration force.

9. The method of claim 1, comprising:
    controlling the position of launch of the atoms within the volume of a Raman laser beam to be nearer an edge of the volume of the Raman laser beam that is opposite the direction of the predicted trajectory of the atoms based on a predicted trajectory of the atoms after launch.

10. The method of claim 9, wherein the direction of the predicted trajectory of the atoms is based on the direction of launch of the atoms and the total effective acceleration force.

11. The method of claim 9, wherein controlling the position of launch of the atoms includes setting the position of the atoms at $1/e^2$ of a radius of the volume of the Raman laser beam when the first pulse of the Raman laser occurs.

12. A method of launching atoms in an atom interferometer, the method comprising:
    determining a predicted trajectory of atoms for measurement in the atom interferometer after launch;
    controlling a position of launch of the atoms within a volume of a Raman laser beam based on the predicted trajectory, wherein controlling the position includes adjusting the position relative to the volume of the Raman laser beam to increase the amount of time the atoms are available for interrogation by the Raman laser beam; and
    obtaining measurements from the atoms.

13. The method of claim 12, wherein controlling the position of launch of the atoms includes setting the position of launch nearer an edge of the volume of the Raman laser beam that is opposite the direction of the predicted trajectory of the atoms.

14. The method of claim 12, comprising:
    determining a direction of the total effective acceleration force on the atoms using readings from a micro-electro-mechanical system (MEMS) vibratory structure accelerometer;
    wherein determining a predicted trajectory includes determining the predicted trajectory of the atoms based on the direction of a total effective acceleration force on the atoms and a direction of launch of the atoms.

15. The method of claim 14, wherein the total effective acceleration force includes the force of gravity and any other acceleration forces on the atoms.

16. The method of claim 13, wherein controlling the position of launch of the atoms includes setting the position of the atoms at $1/e^2$ of a radius of the volume of the Raman laser beam when the first pulse of the Raman laser occurs.

* * * * *